Dec. 13, 1932.  J. S. FORBES  1,890,505
VALVE
Filed Oct. 25, 1930
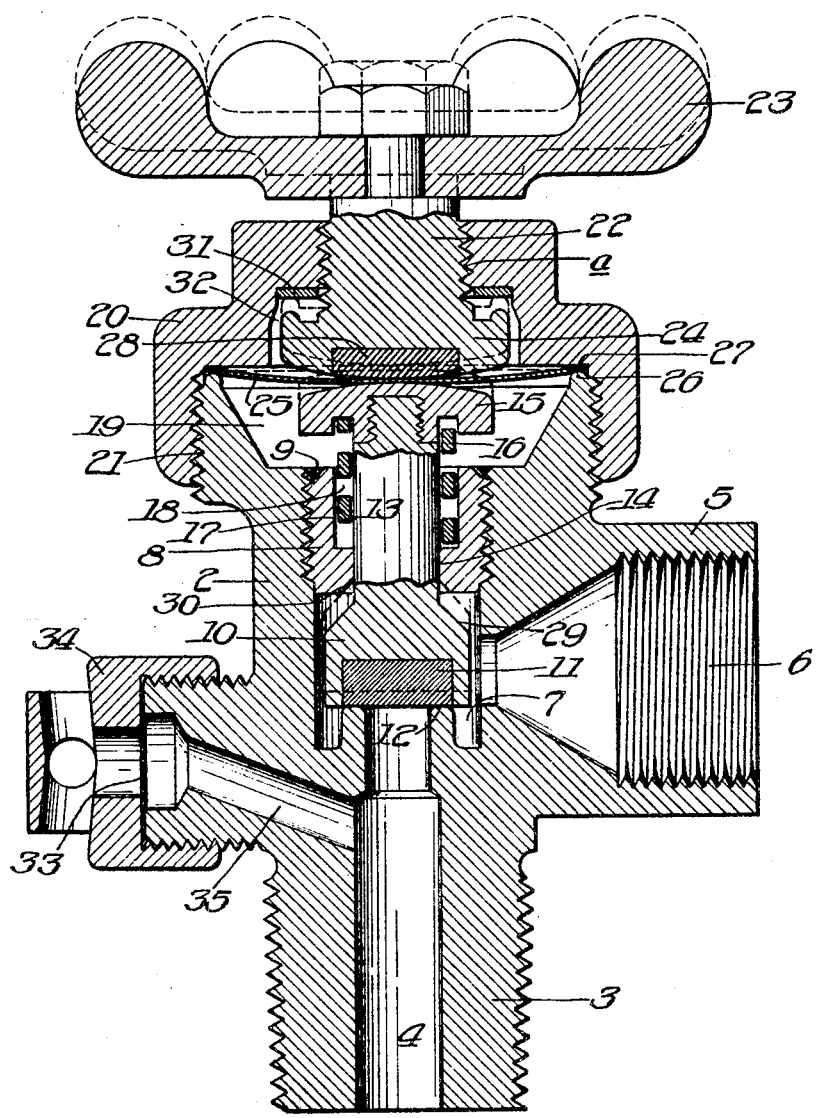
INVENTOR.
J. S. Forbes
BY W. J. Doolittle
ATTORNEY Patented Dec. 13, 1932

1,890,505

UNITED STATES PATENT OFFICE

JOHN S. FORBES, OF PITTSBURGH, PENNSYLVANIA, ASSIGNOR TO KEROTEST MANUFACTURING COMPANY, OF PITTSBURGH, PENNSYLVANIA, A CORPORATION OF PENNSYLVANIA

VALVE

Application filed October 25, 1930. Serial No. 491,230.

My invention relates to improvements in valves, and more particularly to valves of the character known in the art as packless valves, especially designed to be employed in connection with high pressure light fluids, such fluids as are used, for example, in the electric refrigerator industry as well as in other fields where light hydro-carbon gases are utilized.

Packless valves as heretofore constructed have not provided for the removal and/or replacement of the sealing element employed, without shutting off the fluid and removing the valve from the line. In most instances, the replacement of the sealing element can only be made by returning the valve to the manufacturer, thereby causing unnecessary delay and expense.

It is a prime object of this invention to provide a packless valve having a diaphragm sealing element secured in the valve structure in such a manner that the said diaphragm may be removed and/or replaced without interrupting the flow of fluid through the valve, and hence obviating the necessity of removing the valve from the pressure line.

A further object is to provide a valve of the character specified having an imperforate diaphragm for sealing a chamber, means for depressing the diaphragm and the valve stem to close the valve, and back-seating means associated therewith, for preventing the escape of fluid upon opening the valve and during the removal and/or replacement of the diaphragm.

Additional objects and advantages may be more readily understood from the following description, taken in connection with the accompanying drawing, in which the figure is an enlarged longitudinal sectional view of a valve embodying my invention.

Referring to the drawing, 2 designates generally the valve casing or body having a depending externally threaded portion or nozzle 3 formed with an inlet passage 4 therethrough, and a laterally extending portion 5 having a threaded outlet or discharge passage 6 therethrough. The said passages 4 and 6 are in open communication with a valve chamber 7, the latter being positioned centrally of the body 2 and closed at its top by means of a threaded closure plug 8, soldered or otherwise secured to the body 2, as at 9, to provide a fluid-tight seal.

Positioned in the chamber 7, I provide a valve 10. This valve is generally cylindrical in form and has a soft metal insert 11, in the lower face thereof, which is adapted to engage the cylindrical wall constituting a valve seat 12. Valve 10 operates in the said chamber and functions to close off the fluid inlet passage 4, as illustrated. The stem 13 of the valve is slidable in the closure plug 8, as at 14, the stem and plug being so constructed as to provide a sliding fit. An enlarged rounded terminal 15 is secured to the upper end of the valve stem, and is formed with an annular recess 16 for receiving one end of a tension spring 17 positioned around the valve stem, said spring having its other end retained in an annular socket or recess 18 in the closure plug 8.

As shown, the upper end of the valve stem 13 and its terminal 15 are disposed within a supplemental or diaphragm chamber 19 located in the upper portion of the body 2, and separated or spaced from the valve chamber 7.

A removable bonnet 20 is screw-threaded onto the body, as at 21, and is internally threaded at $a$ to receive a separable or independent operating stem or screw 22, the latter having a handle 23 secured thereto. The lower end of the operating stem is formed with an enlarged rounded terminal 24, the said stem 22 and its terminal 24 being alined coaxially with the valve stem 13 and its terminal 15.

Disposed between the ends 15 and 24, for the purpose of closing or sealing the supplemental or diaphragm chamber 19, I provide an imperforate circular diaphragm 25, having its periphery secured between an annular rounded shoulder 26 on the body 2 and an annular abutting shoulder 27 formed on the bonnet 20. If desired, the periphery of the diaphragm may be welded or otherwise secured to the shoulder 26 to provide a more perfect seal. The diaphragm 25 may be in the form of a thin metallic disk, or may comprise a series of thin disk laminations.

When the operating stem 22 is lowered, as in the full-line position of the drawing, the diaphragm 25 will become depressed downwardly by means of the terminal 24, and the valve 10 will be moved into closed position against the action of the spring 17. When the stem 22 is retracted, as indicated by the dotted-line position of the drawing, the spring 17 will raise the valve 10 off its seat 12, whereby the valve stem terminal 15 will flex the diaphragm 25 into the convex-upward position shown in dotted lines.

For the purpose of reducing the wear on the diaphragm 25, due to the rotation of the stem 22 and the terminal 24, I provide a circular insert 28, freely mounted in the rounded surface of the terminal and having a corresponding rounded surface for engaging the diaphragm.

When the parts are in the open or dotted-line position of the drawing, the bonnet 20 may be unscrewed and removed from the body 2, to permit the removal and/or replacement of the diaphragm 25. To prevent the escape of fluid during this operation, the valve 10 is provided with a back-seating portion 29, the said back-seating portion engaging a conical seat 30 in the closure plug 8, to effectively prevent the escape of fluid around the valve stem 13.

Thus, it will be seen that the diaphragm 25 may be removed and/or replaced without interference with the operation of the valve, and without removing the same from the pressure line. The means by which this is accomplished are readily understandable and may be operated by any one not skilled in the art.

A secondary seal may be provided in the bonnet 20 by the insertion of a ring member 31, which cooperates with an upwardly extending annular shoulder 32 on the terminal 24 upon the retraction of the stem 22, to prevent the escape of fluid around the said stem.

A fracturable relief disk 33 is provided in a suitable enclosure, generally designated 34, to normally close a passage 35. Such construction is of the usual and well known type, and affords a safety means in case of excessive pressure.

Various changes and modifications are contemplated, provided they fall within the scope of the following claims.

I claim:

1. In a valve, a valve body having a valve chamber therein, a supplemental chamber spaced from the valve chamber, a valve in the valve chamber having a stem extending between the said chambers, an operating stem in alinement with the valve stem, an imperforate diaphragm closing the supplemental chamber and in contact with the valve and operating stems, and back-seating means on the valve for sealing off the valve chamber from the supplemental chamber when the said valve is in open position, whereby the diaphragm may be removed while the valve is in operation.

2. In a packless valve, a valve body having a valve chamber therein, a supplemental chamber spaced from the valve chamber, a valve in the valve chamber having a stem extending between the said chambers, a rounded terminal on the valve stem within the supplemental chamber, an imperforate diaphragm closing the supplemental chamber, spring means for maintaining the valve stem terminal in contact with the diaphragm, a bonnet on the valve body having a shoulder engaging the periphery of the diaphragm, an operating stem rotatable in the bonnet having a rounded terminal engaging the diaphragm, and back-seating means on the valve for sealing off the valve chamber from the supplemental chamber when the said valve is in open position, whereby the diaphragm may be removed while the valve is in operation.

In testimony whereof I affix my signature.
JOHN S. FORBES.